(12) United States Patent
Koppelaar et al.

(10) Patent No.: US 9,071,326 B2
(45) Date of Patent: Jun. 30, 2015

(54) DISTRIBUTED RADIO SYSTEM

(71) Applicant: NXP B.V., Eindhoven (NL)

(72) Inventors: Arie Geert Cornelis Koppelaar, Giessen (NL); Alessio Filippi, Eindhoven (NL); Artur Tadeusz Burchard, Eindhoven (NL); Hong Li, Veldhoven (NL); Andrew Turley, Elst (NL)

(73) Assignee: NXP, B.V., Eindhoven (NL)

( * ) Notice: Subject to any disclaimer, the term of this patent is extended or adjusted under 35 U.S.C. 154(b) by 0 days.

(21) Appl. No.: 14/307,134

(22) Filed: Jun. 17, 2014

(65) Prior Publication Data

US 2015/0016576 A1    Jan. 15, 2015

(30) Foreign Application Priority Data

Jul. 1, 2013    (EP) .................................... 13174584

(51) Int. Cl.
| | |
|---|---|
| *H04B 1/18* | (2006.01) |
| *H04B 7/04* | (2006.01) |
| *H04B 1/06* | (2006.01) |
| *H04B 7/08* | (2006.01) |

(52) U.S. Cl.
CPC ................ *H04B 1/18* (2013.01); *H04B 7/0404* (2013.01); *H04B 1/06* (2013.01); *H04B 7/08* (2013.01)

(58) Field of Classification Search
CPC ...... H04B 7/08; H04B 7/0413; H04B 7/0404; H04L 1/06; H04L 27/2647; H04L 25/00; H04L 1/18
USPC .................................. 375/267, 299, 340, 347
See application file for complete search history.

(56) References Cited

U.S. PATENT DOCUMENTS

| | | | |
|---|---|---|---|
| 2009/0245443 A1 | 10/2009 | Takayama et al. | |
| 2013/0215945 A1* | 8/2013 | Eitel et al. | ...................... 375/224 |
| 2014/0184921 A1 | 7/2014 | Suglyama et al. | |

FOREIGN PATENT DOCUMENTS

| | | |
|---|---|---|
| EP | 1 533 918 A2 | 5/2005 |
| EP | 1 557 962 A1 | 7/2005 |
| EP | 1 909 423 A1 | 4/2008 |
| WO | 2008/089179 A1 | 7/2008 |
| WO | 2012/153575 A1 | 11/2012 |

OTHER PUBLICATIONS

DiBcom; "White Paper No. 3—Rev B"; 4 pages.
Extended European Search Report for application No. 13174584.6 (Jan. 7, 2014).

* cited by examiner

*Primary Examiner* — Leon Flores (57) ABSTRACT

A distributed radio system comprising a first receiver (1) and a second receiver (2) each receiver comprising a tuner (11, 21) adapted to receive radio signals and to transmit tuned radio signals, a first baseband unit (12, 22) coupled to the tuner (11,21) and adapted to receive the tuned radio signals and to partially demodulate the tuned radio signals, the first baseband unit (12,22) being further adapted to transmit partially demodulated signals, a second baseband unit (14, 24).
The distributed radio system further comprising a digital communication channel (3) adapted to receive the partially demodulated signals and to redistribute the partially demodulated signals to the second baseband unit (14, 24).

13 Claims, 7 Drawing Sheets

DISTRIBUTED RADIO SYSTEM

CROSS-REFERENCE TO RELATED APPLICATIONS

This application claims the priority under 35 U.S.C. §119 of European patent application no. 13174584.6, filed on Jul. 1, 2013, the contents of which are incorporated by reference herein.

FIELD OF THE INVENTION

The disclosure relates to a distributed radio system and to a method of operating a radio system.

BACKGROUND OF THE INVENTION

In this application we shall use the term "mobile" with the meaning of a device mounted on a vehicle as a car, airplane, etc.

Mobile devices such as e.g. receivers, transmitters are more and more used in cars, avionics i.e. in objects that are changing their position in time. The communications are normally implemented using wireless communications. Each communication device used in these environments has a physical layer. The physical layer (PHY) of a wireless communication device usually includes an antenna, a transceiver, and a baseband processing unit. The connection between the antenna and the transceiver normally uses a cable that should have good transfer properties for the signals that are either captured by the antenna or have to be sent by the antenna as e.g. small reactance, small resistance. These signals are normally modulated at a Radio Frequency (RF), such that the propagation through the air is possible. The cable properties have to be such that the modulated signals experience hardly any distortion and attenuation, e.g. coaxial cables. Since attenuation scales with the cable length, cable length should be kept to a minimum. Also, for cost reasons, there is a motivation to reduce the use of lengthy cables with stringent transfer characteristics to a minimum.

In some cases, a long cable cannot be easily avoided. For example, a communication device in a car experiences the challenges of having an antenna at a position that is favorable for reception/transmission conditions e.g. on the roof of the car and a transceiver and baseband processing unit that is placed at the head-unit or in the trunk. The trend of using more antennas for Receiving/Transmitting (Rx/Tx) diversity and Multiple Input Multiple Output (MIMO) for improving the communication properties as e.g. robustness, throughput increases the need of lengthy cables.

Moreover, it is desirable to have a scalable solution such that a multi-antenna communication device delivering a service that can be easily extended with more communication devices which deliver a multitude of services without requiring a lot of costly cables.

RF cables can be avoided when the transceiver is located close to the antenna. When the baseband processing unit is placed close to the antenna, no expensive RF cables are necessary.

Figure 1:
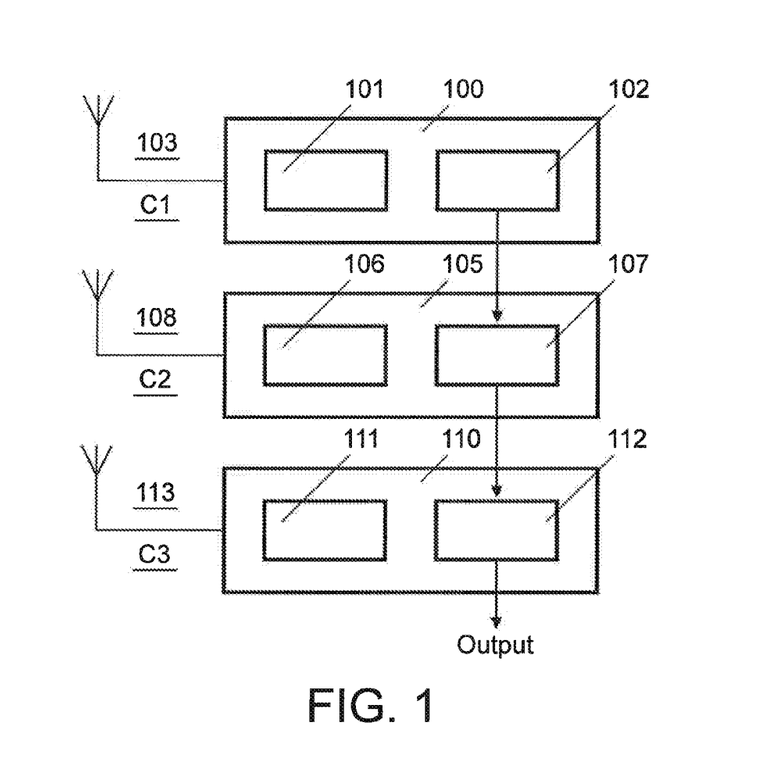
FIG. 1 depicts a prior art distributed radio.

However, this approach, although possible, severely limits the potential diversity gain of multiple antenna solutions. A solution that combines scalability with antenna diversity is shown in FIG. 1. In this solution, several baseband signals of DVB-T demodulators are combined in order to achieve diversity gain. The system comprises three receivers 100, 105 and 110, each receiver being connected to a respective antenna 103, 108, 113 for receiving RF signals. Each receiver comprises a respective tuner 101, 106, 111 and a respective baseband i.e. DVB-T demodulators 102, 107, 112 for demodulating the signals received from the respective tuners. A drawback of this solution is that the DVB-T demodulators have to be co-located close to each other and therefore lengthy costly cables cannot be avoided between the antennas and tuners.

Figure 2:
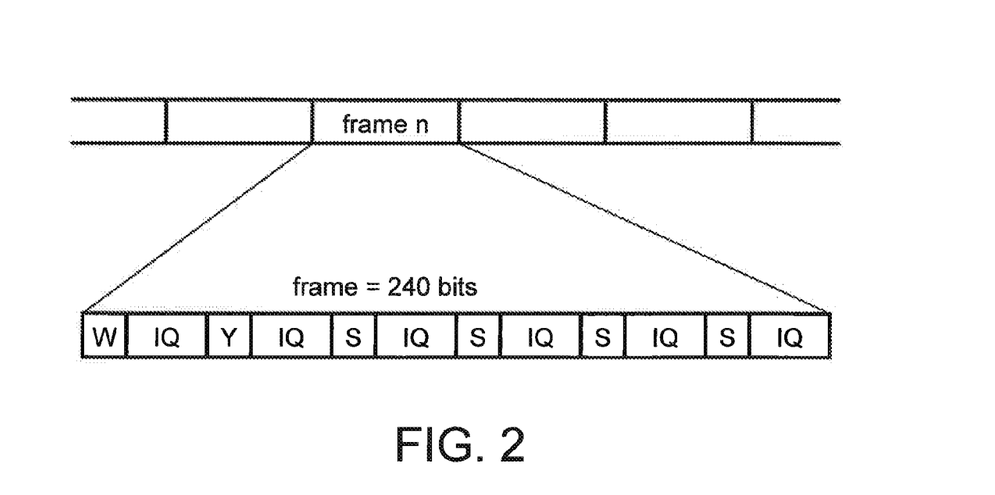
FIG. 2 depicts a serially transmitted frame.

An alternative solution is shown in FIG. 2. FIG. 2 depicts the structure of a signal used on a serial interface targeting the communications among multiple tuner chips and a baseband chip.

The signal comprises a header, the header including a whitening seed W and synchronizing bits Y. The header is followed by a payload comprising the IQ signal and the status bits. However, the system of FIG. 2 shares the same oscillator, and this is not possible in a distributed architecture involving long distances between its multiple components. The information shared among the multiple tuner ICs includes a forwarded clock signal. The system provides a clock recovery from a whitened data signal included in the transmitted data.

Part of the Automated Gain Control (AGC) loop of this solution is done over the communication channel. This might be an unnecessary limitation as the AGC loop can be implemented close to the antenna but also close to the communication channel.

The structure of a frame for exchanging data between tuner and baseband processing is shown in FIG. 2 and this specific structure can be further used in other configurations.

A tuner mat comprise typically an input circuitry for adapting to an antenna, the antenna receiving an incoming RF radio signal in a specific frequency range and having a certain modulation as e.g. frequency modulation (FM), amplitude modulation (AM), orthogonal frequency division multiplexing (OFDM), etc. The tuner further comprises an amplifier for amplifying the incoming RF signal and for delivering an amplified RF signal. The tuner further comprises a local oscillator (LO) which generates a signal of frequency $f_o$ which is provided to a mixer. The mixer further receives the amplified RF signal having a frequency $f_{RF}$ and delivers an intermediate frequency (IF) signal which has the frequency $f_I = f_{RF} - f_o$. If $f_{RF} = f_o$, then the resulting signal is situated in the baseband and the receiver is called zero-IF receiver. The mixer may be active or passive. For quadrature modulated input signals as the OFDM ones, the mixer comprises two mixing sections: one for the in-phase component (I) and another one for Quadrature one (Q). Usually, a feedback from the mixer to the amplifier is provided in order to keep the overall gain of the amplifier at a desired level, independent of the input frequency. This feedback is usually defined as the Automatic Gain Control (AGC). The feedback is usually controlled by a controller which is adapting it at appropriate time events as e.g. during the preambles of the packets or during guard intervals. The control data from the controller, which normally is a digital one, might be transmitted to the next stages in the radio. The radio may also have a Received Signal Strength Indication (RSSI) which is an indication of the received RF signal intensity. The RSSI signal is also available as a digital signal and therefore it can be easily transmitted to other stages. The AGC and RSSI can be easily embedded in any serially transmitted information provided that a parallel to serial converter is provided.

The Analog to digital converter (ADC) transforms the IF signal into a digital one. The ADC acquisition process and output generation is controlled by a clock signal (Ck). Without limitation, the ADC could be either a Nyquist e.g. flash, Successive Approximation (SAR) one or Sigma-Delta one (SD). The digital signal may be present as a parallel digital word for example as in the flash AD converter case. In this case serializer i.e. a parallel to serial converter, is connected to the output of the converter that transforms the parallel digital word into a serial one. Alternatively, the ADC may provide directly a serial output.

A baseband system is considered to receive the digital IF and to demodulate it according to the type of modulation of the signal. This demodulation applies specific algorithms that might be implemented either in hardware, software or a combination thereof. The demodulation could be made in full i.e. at the output of the baseband system the demodulated useful signal is obtained, or partially i.e. part of the demodulation is carried out in a first subsystem and the remaining part is carried out in a different subsystem, not necessary situated on the same chip or module with the first subsystem.

In wireless communications, diversity gain is considered to be the increase in signal-to-noise ratio due to some diversity scheme, or how much the transmission power can be reduced when a diversity scheme is introduced, without a performance loss. Diversity gain is usually expressed in decibel, and sometimes as a power ratio.

Throughout the present description, equal reference numbers used in different figures refer to same devices or features.

SUMMARY OF THE INVENTION

It is an object of present invention to provide a distributed radio system which may preserve the advantage of diversity and may reduce the costs associated with long or expensive communication cables.

This object is achieved in a distributed radio system comprising a first receiver and a second receiver each receiver comprising:
- a tuner adapted to receive radio signals and to transmit tuned radio signals;
- a first baseband unit coupled to the tuner and adapted to receive the tuned radio signals and to partially demodulate the tuned radio signals, the first baseband unit being further adapted to transmit partially demodulated signals;
- a second baseband unit;

the distributed radio system further comprising a digital communication channel adapted to receive the partially demodulated signals and to redistribute the partially demodulated signals to the second baseband unit.

The proposed solution addresses the problem of long and expensive coax cables since digital communication channels usually use much cheaper cables, e.g., Ethernet cable, serial link cable or even no cables in case of digital wireless communications. The digital communication channel transmits control signals to each of the base-band units for controlling the gain of the tuners and control signals for data selection.

Preferably, the partially demodulated signals are serially transmitted. In this way a further cost reduction is possible as the number of cables necessary to transmit serially the signals reduces to two, a signal wire and a ground wire.

In an embodiment, the tuned radio signals are inputted into an analog to digital converter, the analog to digital converter serially transmitting digital signals to the first baseband unit for partially demodulating the digital signals. In this way the analog to digital converter conserves all the signal information required for diversity gains.

Preferably, the serially transmitted signals are clockless digital signals embedding clock signals that have a fixed relationship with a clock of the analog to digital converter. The clockless digital signals are signals that do not have a separate communication connection for the clock signal. In state of the art receivers, the digital signals may be dependent on the analog to digital converter clock frequency and phase, the clock being generated locally in each receiver. However, if the serial signals comprise a separate clock line then, depending on the distance covered by the serial communication channel, a phase shift between the digital signals and the clock signal appears making very hard to resynchronize them. In order to avoid this pitfall, a clockless serial digital signal may be generated i.e. a serial digital signal embedding the clock signal of the analog to digital converter or a clock signal that has a fixed relationship with the clock of the analog to digital converter. These signals maintain the phase relationship between the data signals and the clock signal, no matter how long the communication link is Even more, the signals are easily transmitted via cheap transmission cables or even wirelessly. At the receiver end, the clock information is recovered and therefore the clock signal of the converters becomes available. In this way the digital transmitted signals of the various radios can be brought to a common time domain representation and with an e.g. cross-correlation operation effected on the digital signals the time-phase relation can be restored.

In another embodiment, each receiver comprises an input/output system arranged between the analog to digital converter and the respective first baseband unit and adapted to
- transmit the partially demodulated signals from the first baseband unit of the first receiver to the digital communication channel;
- receive the partially demodulated signals generated by second receiver via the digital communication channel; and
- transmit the received partially demodulated signals of the second receiver to the second baseband unit of the first receiver for full demodulation.

The distributed radio system may be adapted to receive signals according to a same or different communication standard. It means that the receivers may be or may be not of the same kind e.g. they are of the same kind and we want to maintain the diversity in the system. However, the receivers may be adapted for different radio standards as broadcast FM radio, RDS, Wi-Fi, Digital video broadcasting in different flavors, etc.

In another embodiment, each receiver further comprises a second tuner, the first tuner being coupled to the first analog to digital converter, the second tuner being coupled to a second analog to digital converter. In this embodiment the first and second tuner may be identical or not i.e. adapted to receive the same type of input signals or different ones.

In another embodiment, the input/output system of the first receiver the input/output system of the first receiver is adapted to receive the serially transmitted signals by the second analog to digital converter included in the first receiver and to transmit the serially received signals to the input/output system of the second receiver via the digital communication channel, the second baseband unit of the second receiver demodulating the signals received by the both second tuners.

Yet in another embodiment, the input/output system of the second receiver is adapted to receive the serially transmitted signals by the first analog to digital converter of the second receiver and to transmit the serially received signals to the input/output system of the first receiver via the digital communication channel, the baseband unit of the first radio demodulating the signals received by both first tuners.

In this way the signals received at the input of any tuner situated in any receiver are partially demodulated, transmitted serially to a different receiver and then finally demodulated in the baseband unit of the different receiver. Thus it is possible to demodulate signals according to a specific standard only in a dedicated baseband unit maintaining the diversity. This is possible in complex receiving systems because they are adapted to demodulate a wide type of radio signals.

In an embodiment, each receiver comprises a respective digital front end coupled between one of the respective analog to digital converters and the respective input/output system for correcting errors occurring during reception and conversion of signals received by the first or second receiver. The digital front end may be a passive digital front end. In this approach correction circuitry that correct imperfections of the analog front end i.e. the tuner are placed locally directly after the ADC. This circuitry may include circuits for correcting I/Q-mismatch, DC-offset, carrier frequency offset and symbol time offset. The data values used to control the correction circuits are generally estimated in the baseband unit and are then communicated over the digital communication channel. The programming of the tuner is also done over the digital communication channel, e.g. carrier frequency and tuner gain. Since, the ADC maybe oversampled, the signal maybe be decimated in order to lower the data rate over the digital communication channel.

Additionally, the digital front end may be an active digital front end. For some applications it is necessary to have short latency control loops, in particular for packet based communication it is important to have fast acquisition of the received signals. In that case it might be necessary to have the estimation of one or more correction values close to the place where they are applied. When both the correction and the estimation of the correction values are done locally close to the antenna, we call this approach "ADC and active digital front end". Also the tuner gain control algorithm can be situated locally.

In an embodiment, each receiver comprises a control unit adapted to control the parameters of the tuner and the operation of the first baseband unit, the control unit generating control parameters, the receiver further comprising a multiplexing unit for combining a partial demodulated signal generated by the first baseband, the signal being indicative for a partial demodulation of the input signal, the multiplexing unit further receiving control parameters from the control unit, the multiplexing unit being adapted to generate a serial signal representative for the partial demodulated signal multiplexed and for the control parameters generated by the control unit.

Preferably, the multiplexing unit comprises a multiplexer coupled to a serializer.

The distributed radio system comprises a set of chips, each receiver being implemented in a separate chip.

In an embodiment, the radio system is mounted on a vehicle as a car.

In an embodiment it is presented a method for operating a distributed radio system comprising steps of:
   receiving a first of and a second radio signal in an respective tuner and generating tuned radio signals,
   transmitting the tuned radio signals to a respective first baseband unit,
   partially demodulating the tuned signals in the first baseband unit and generating partially demodulated signals,
   transmitting the partially demodulated signals to a digital communication channel,
   redistributing the partially demodulated signals to a second baseband unit.
The method further comprises steps of
   analog to digital converting the respective tuned radio signals,
   serially transmitting digital signals generated by the analog to digital converters.

The invention is defined by the independent claims. Dependent claims define advantageous embodiments.

BRIEF DESCRIPTION OF THE DRAWINGS

The above and other advantages will be apparent from the exemplary description of the accompanying drawings in which.

DETAILED DESCRIPTION OF EMBODIMENTS

Figure 3:
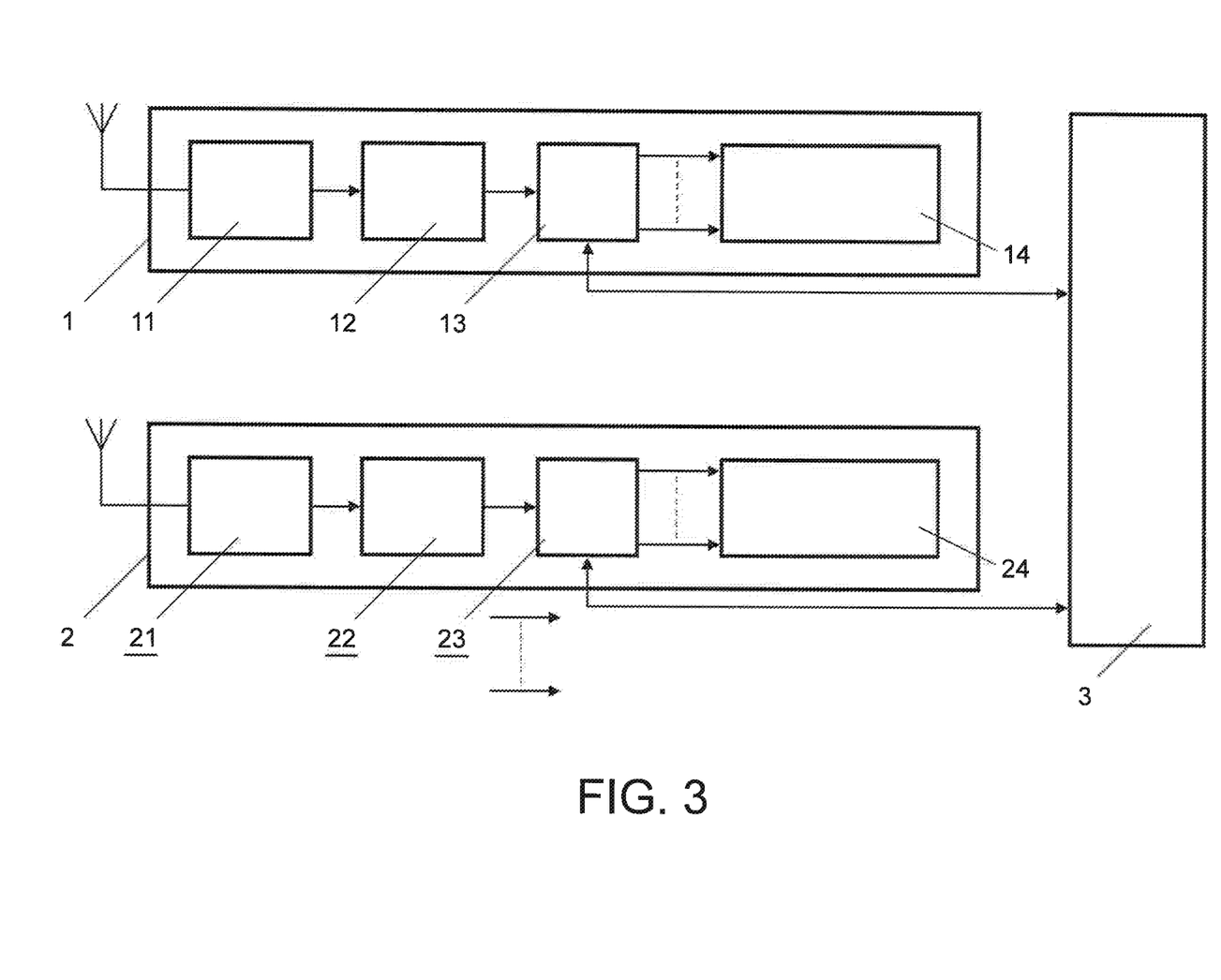
FIG. 3 depicts a distributed radio system, according to an aspect of the invention.

FIG. 3 depicts distributed radio system according to an embodiment of the invention. The distributed radio system comprises a first receiver 1 and a second receiver 2 each receiver comprising a tuner 11, 21 adapted to receive radio signals and to transmit tuned radio signals, a first baseband unit 12, 22 coupled to the tuner 11,21 and adapted to receive the tuned radio signals and to partially demodulate the tuned radio signals, the first baseband unit 12,22 being further adapted to transmit partially demodulated signals. The receivers 1, 2 further comprise a second baseband unit 14, 24. The distributed radio system further comprises a digital communication channel 3 adapted to receive the partially demodulated signals and to redistribute the partially demodulated signals to the second baseband unit 14, 24. In this way the partially demodulated signals obtained in the first receiver 1 may be fully demodulated in the second receiver 2. The first receiver 1, the second receiver 2 and the digital communication channel 3 may be implemented on different chips. Normally, the tuners are situated near their respective antennae but the digital communication channel 3 may be situated in a remote position.

In the distributed radio system, the respective tuned radio signals may be inputted to an analog to digital converter, the analog to digital converter serially transmitting digital signals to the first baseband unit 12, 22 for partially demodulating the digital signals. Preferably, the serially transmitted signals are clockless digital signals i.e. they are digital signals that do not explicitly have a separate clock line. Clockless digital signals can be transmitted on a longer distance and the phase relationship between the clock and the data are maintained. However, for being able to coherently combine the two signals, clock information of the two signals should be available e.g. by means of an embedded clock signal. As an example, Non-Return to Zero (NRZ) signals are such signals and they are frequently used in digital clockless communications. The serial connection between the chips may be a cheap cable and if the serial signals are transmitted wirelessly, no cable is necessary. Each receiver 1,2 comprises an input/output system 13, 23 arranged between the analog to digital converter and the respective first baseband unit 12,22. The input/output systems 13,23 are adapted to:
   transmit the partially demodulated signals from the first baseband unit 13 of the first receiver 1 to the digital communication channel 3, receive the partially demodulated signals generated by second receiver 2 via the digital communication channel 3, and transmit the received partially demodulated signals of the second receiver 2 to the second baseband unit 14 of the first receiver for full demodulation.

The signals received by the tuners 11, 21 may be of the same kind i.e. using the same type of modulation and the same frequency range, but they might be very well differently.

The distributed system provides all the necessary means for keeping the diversity, if the signals are of the same kind but also can work properly with different signals.

Figure 4:
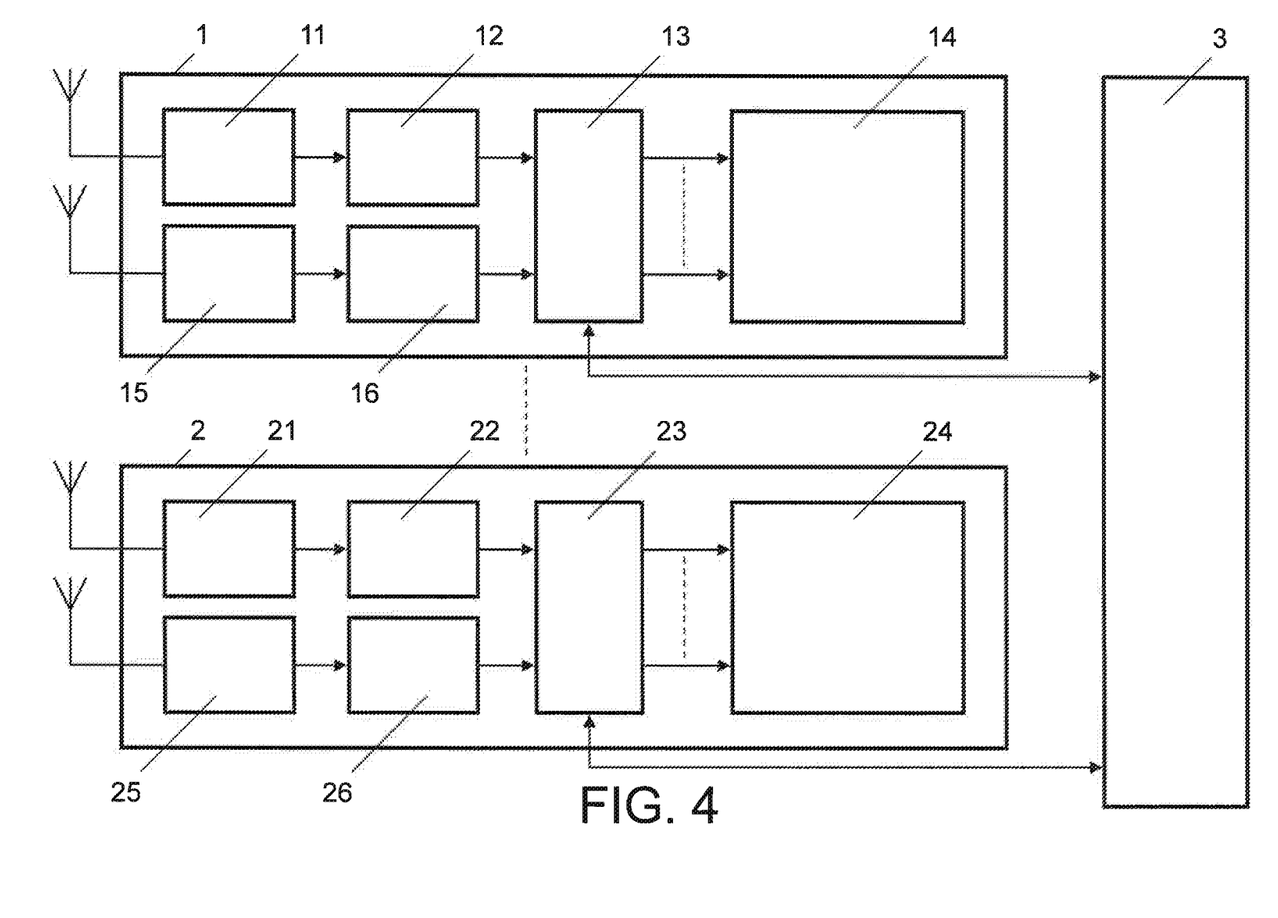
FIG. 4 depicts a more general structure of a distributed radio system, according to another aspect of the invention.

FIG. 4 depicts distributed radio system according to an embodiment of the invention.

In the distributed radio system shown in FIG. 4, each receiver 1,2 further comprises a second tuner 15, 25 the first tuner 11,21 being coupled to the first analog to digital converter and the second tuner 15, 25 being coupled to a second analog to digital converter. In this embodiment it is considered that on a specific receiver chip there are two separate tuners, each tuner being adapted to receive potentially different radio signal according to different radio standards. Alternatively the receivers may receive radio signals according to the same standard.

The input/output system 13 of the first receiver 1 is adapted to receive the serially transmitted signals by the second analog to digital converter included in the first receiver 1 and to transmit the serially received signals to the input/output system 23 of the second receiver 2 via the digital communication channel 3, the second baseband unit 24 of the second radio 2 demodulating the signals received by both second tuners 15, 25.

Alternatively the input/output system 23 of the second receiver 2 is adapted to receive the serially transmitted signals by the first analog to digital converter of the second receiver 2 and to transmit the serially received signals to the input/output system 13 of the first receiver 1 via the digital communication channel 3, the second baseband unit 14 of the first receiver 1 demodulating the signals received by both first tuners 11, 21.

The above solution can work concurrently, too, meaning that, for example, it can be arranged that the signals received by the first tuner 11, 21 are fully demodulated in the first receiver 1 and the signals received by the tuners 15, 25 are fully demodulated in the second receiver 2 and the other way around. In this way signals received at the input of any tuner situated in any receiver are partially demodulated, transmitted serially to a different receiver and then finally demodulated in the baseband unit of the different receiver. In this way, the signals according to a specific standard may be demodulated only in a dedicated baseband unit, maintaining the diversity. This is possible in complex receiving systems because they are adapted to demodulate a wide range of radio signals.

Figure 5:
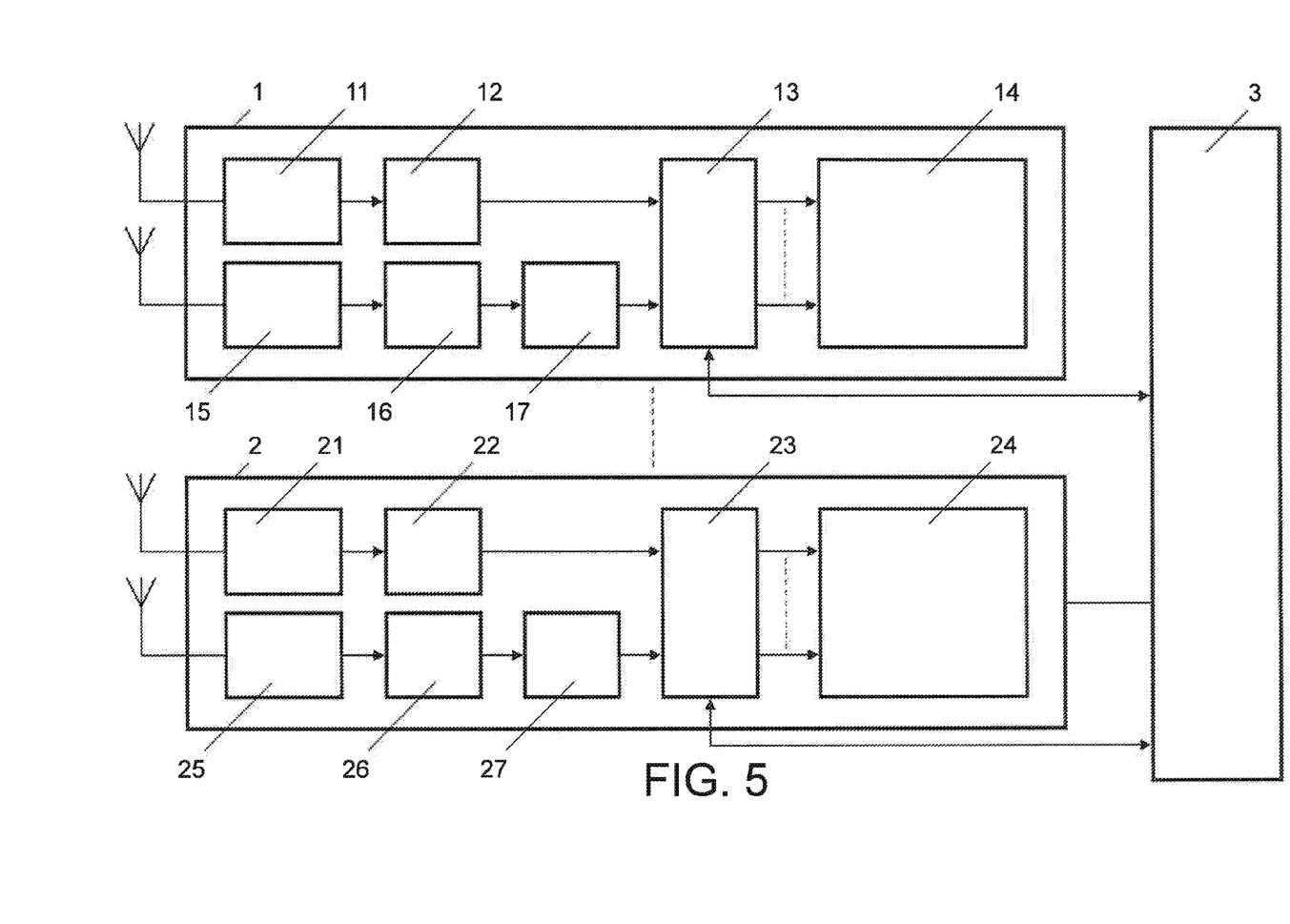
FIG. 5 depicts a more detailed structure of a distributed radio system, according to an embodiment.

FIG. 5 depicts a more detailed embodiment of a distributed system.

The distributed radio system shown in FIG. 5 comprises the same elements as the system depicted in FIG. 4. Each receiver 1,2 further includes a respective digital front end 17, 27 coupled between one of the respective analog to digital converters and the respective input/output system 13, 23. The digital front end 17, 27 is adapted to correct errors occurring during reception and conversion of signals received by the first or second receiver 1,2.

The digital front end 17, 27 may be a passive digital front end. In this approach correction circuitry which are adapted to correct imperfections of the analog front end i.e. the tuner are placed locally directly after the ADC. This circuitry may include circuits for correcting I/Q-mismatch, DC-offset, carrier frequency offset and symbol time offset. The data values used to control the correction circuits are generally estimated in the first baseband unit and are then communicated over the digital communication channel. The programming of the tuner is also done over the digital communication channel, e.g. carrier frequency and tuner gain. Since, the ADC may be oversampled, the signal may be decimated in order to lower the data rate over the digital communication channel.

Additionally, the digital front end 17, 27 may be an active digital front end. For some applications it is necessary to have short latency control loops, in particular for packet based communication it is important to have fast acquisition of the received signals. In that case it might be necessary to have the estimation of one or more correction values close to the place where they are applied. When both the correction and the estimation of the correction values are done locally close to the antenna, we call this approach "ADC and active digital front end". Also the tuner gain control algorithm can be situated locally.

It is further observed that even if all the tuners of the system are adapted to receive the same type of signals the receivers may have different structures.

Figure 6:
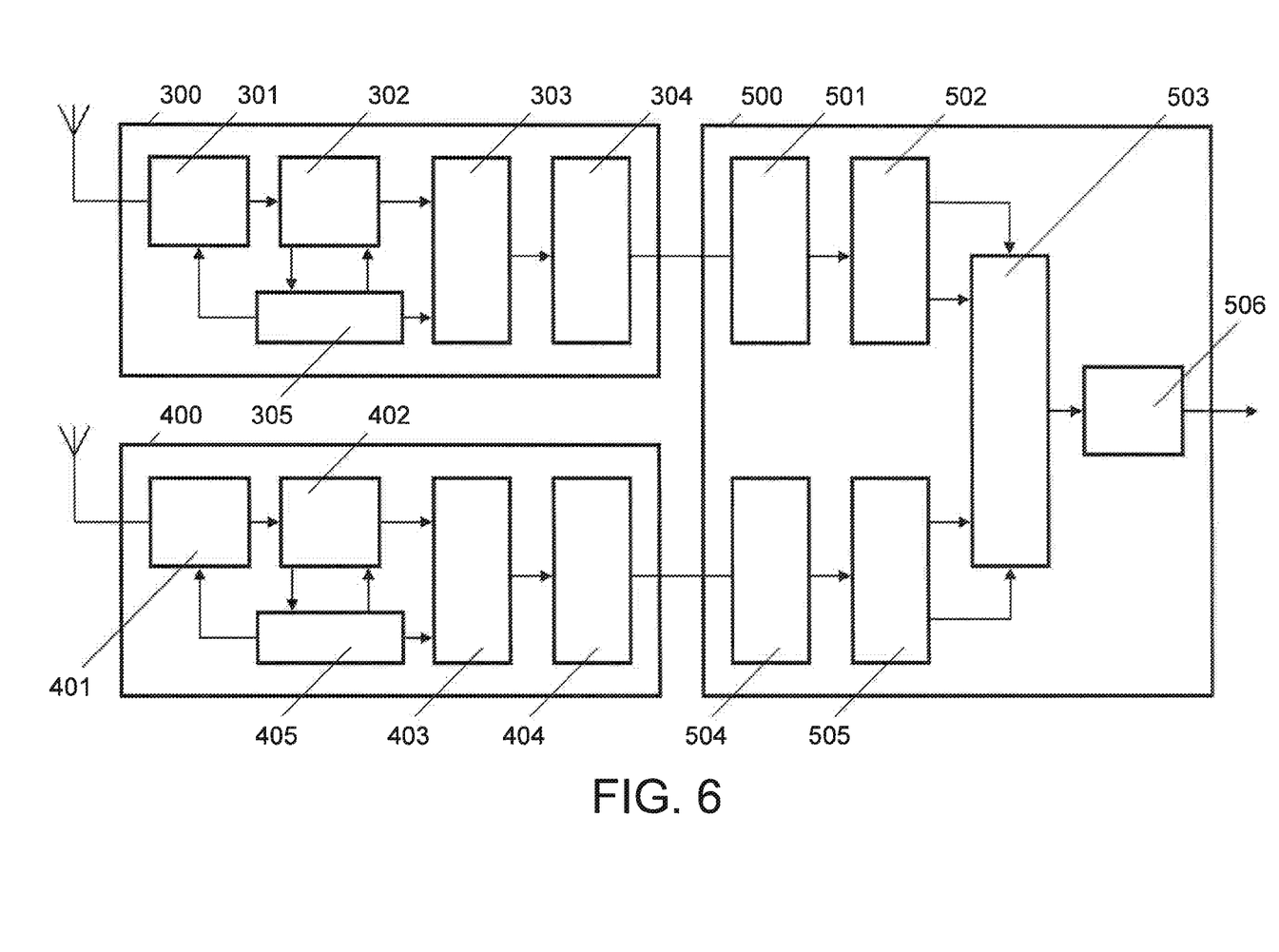
FIG. 6 depicts a receiver of a distributed radio system, according to another embodiment of the invention.

FIG. 6 depicts another embodiment of the distributed radio system.

In the distributed radio system shown in FIG. 6 each receiver comprises a control unit 305, 405 adapted to control the parameters of the tuners and the operation of the first baseband, the receiver further comprising a multiplexing unit 303, 403 for combining partial demodulated signal samples generated by the baseband block 302, 402 the signal being indicative for a partial demodulation of the input signal. The multiplexing unit 303, 403 further receives control parameters from the control unit 305, 405 the multiplexing unit 303, 403 being adapted to generate a clockless serial signal representative for the partial demodulated signal multiplexed with the control parameters generated by the control unit. The multiplexing unit comprises a multiplexer 303, 403 coupled to a serializer 304, 404. The multiplexer 303, 403 combines the partially demodulated signals and the control parameters and the serializer 304, 404 creates either a stream of pure digital signals or a stream of frames which are then transmitted via the digital communication signal. At the reception side, the signals transmitted by the serializers 304, 404 are received in a digital interface circuit (501, 504 and demultiplexed in the demultiplexer circuits 502, 505. The signals generated by the demultiplexer circuits 502, 505 are combined and synchronized in module 503. A second base band unit 506 provides the complete demodulation of the signal.

Figure 7:
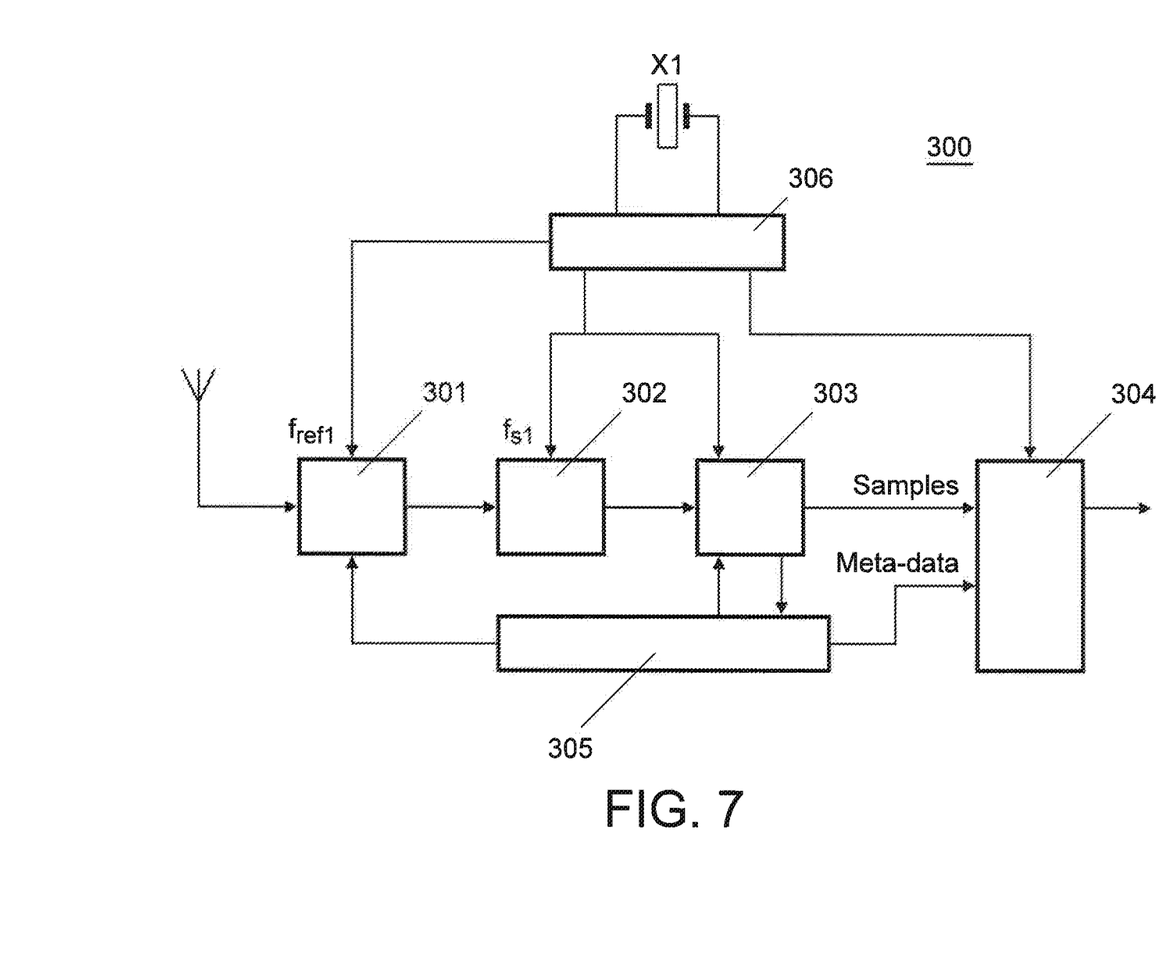
FIG. 7 depicts a tuner included in a distributed radio system according to an aspect of the invention.

FIG. 7 depicts a more detailed embodiment of a receiver.

In the distributed radio system shown in FIG. 7 each receiver comprises a control unit 305 adapted to control the parameters of the tuners and the operation of the first baseband, the receiver further comprising a multiplexing unit 304 for combining partial demodulated signal samples generated by the baseband block 303, the signal being indicative for a partial demodulation of the input signal. The multiplexing unit 304 further receives control parameters Meta-Data from the control unit 305, the multiplexing unit 304 being adapted to generate a clockless serial signal representative for the partial demodulated signal multiplexed with the control parameters generated by the control unit.

Figure 8:
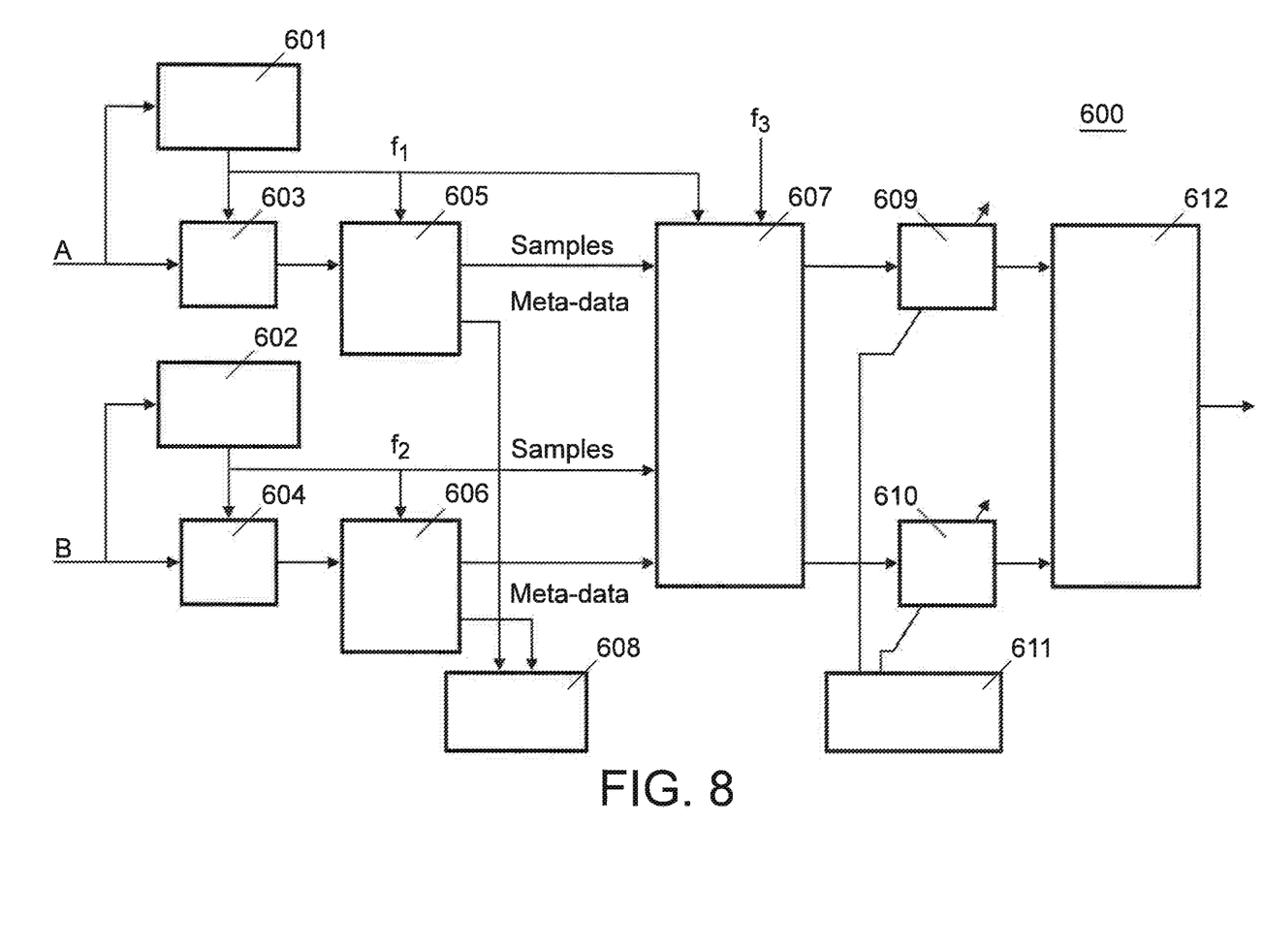
FIG. 8 depicts a baseband unit included in a distributed receiver according to another aspect of the invention.

FIG. 8 depicts a more detailed embodiment of the distributed receiver.

In FIG. 8 it is depicted the receiving part of the radio system depicted in FIG. 7. It comprises a clock recovery circuitry 601, 602 coupled to a slicer 603, 604 for recovering the clock signal used in the transmitting part shown in FIG. 7. Then the data is de-serialized in the de-serializers 605, 606 which are controlled by the recovered clock signal f1. The de-serializers 605, 606 transmit the recovered samples and the Meta Data, as e.g. tuner gain, the strength of the input signal (RSSI). The samples signals are re-sampled in the circuit block 607 and the rsulting signals are then passed through time alignment circuits 609, 610 for aligning them in time domain. Finally the aligned signals are combined and demodulated in the second baseband unit 612 for obtaining the useful signal.

Depending on the standard the receiver system is targeting, there might be different preferred partitioning of the physical layer algorithms and therefore different choices for the distributed system can be made.

It is observed that a combination of any of the previously presented partitions of the receiver system can be made as it is shown in the following considerations.

For an AM Radio: When the Automatic Gain Control (AGC), which is a Meta Data signal, is done locally, the applied tuner gain needs to be communicated to the central secondary baseband processing in order to do optimal combining of two or more radios.

For an FM Radio: Preferred combining method is phase diversity i.e. equal gain combining, because of FM threshold effect. Signals should be aligned in time and phase and therefore the applied tuner gain has to be known and compensated for. Preferably, the AGC control may be closer to the antenna. The gain compensated digital samples are tagged with the applied gain. At the combining unit the two or more streams should be combined using equal gain combining and the applied tuner gain is used for this purpose. Moreover, the two or more streams are combined in time and their phases should be aligned. Therefore, the streams should be brought to a common clock domain using cross-correlation techniques. The difference in reception path latency should be compensated for.

For a Digital Radio/TV using OFDM (DAB, HD Radio, DVB-T, ISDB-T). Several splits may be made, resulting in a trade-off between data rates to be exchanged and amount of processing close to the antenna. A preferred place for splitting the physical layer is after sub-channel equalization. However for software de-mapping, the channel state information per sub-channel is needed and should therefore be exchanged as well. Exchange of data is done on base of OFDM symbols and meta-data includes an OFDM symbol number such that the corresponding OFDM symbols are combined.

For a Digital Radio/TV using single carrier modulation. When the system should be robust against multipath, channel equalization is needed. When decision directed equalization is used, decisions of the combined signal are more reliable and preferred for the equalizer update algorithm. The positioning of the equalizer close to the antenna, requires communication of the decisions made after the combiner to the equalizer units. The feedback of the decisions is not needed when the equalization is done for the individual radios at the central baseband processing unit.

For an IEEE802.11a,g,n,p & ac. (WiFi, ITS) radio: These standards use OFDM modulation, so concerning receiver partitioning, the same holds as for Digital Radio/TV using OFDM. IEEE802.11p differs in the fact that it is used in highly mobile channel such that preamble based channel estimation does not suffice and one may use decision directed approaches. Another difference is that IEEE802.11 is a half-duplex communication standard, such that next to reception, also transmission over multiple antennas (MIMO and Tx diversity) should be solved. The standard requires that symbol clock and carrier frequency are derived from the same reference. Furthermore the transmission of the several antennas should be time-aligned (ranging over the digital communication channel can be used to estimate the latency between baseband and transceiver).

For a Radar system working in the frequency range of 60 GHz and having several antennae and a combiner. In case of no co-located antennae, the distribution of the local oscillator (LO) may be a challenge. When frequency modulated continuous wave (FMCW) is used, the reception/demodulation is done with the modulated LO that is used for transmission. Phase aligned LO distribution over a distributed architecture maybe difficult.

If the signal is a digital signal, e.g. a DAB, HD-radio, China Multimedia Mobile Broadcast (CMMB), Integrated Service Digital Broadcast-Terrestrial (ISDB-T), DVB-T, Wi-Fi IEEE802.11a, etc., it includes information in the form of known pilots which can be used to find the proper time and frequency and frame synchronization. The combining unit is then capable of properly combining the multiple outputs of the ADCs. The reduction of the data rate over the digital channel could be achieved by implementing part of the baseband processing just after the ADC. In general all the functions that drive the RF to baseband block could run locally. Furthermore, the time and frequency synchronization of the digital data could run locally, the channel estimation and also pilot extraction. Also the data equalization could run locally, but it would then require a different set of data to be transmitted over the digital communication channel. The data should then include the channel state information and time stamps.

It is remarked that the scope of protection of the invention is not restricted to the embodiments described herein. Neither is the scope of protection of the invention restricted by the reference numerals in the claims. The word "comprising" does not exclude other parts than those mentioned in the claims. The word "a(n)" preceding an element does not exclude a plurality of those elements. Means forming part of the invention may both be implemented in the form of dedicated hardware or in the form of a programmed purpose processor. The invention resides in each new feature or combination of features.

The invention claimed is:

1. A distributed radio system comprising a first receiver and a second receiver each receiver comprising:
    a tuner adapted to receive radio signals and to transmit tuned radio signals;
    a first baseband unit coupled to the tuner and adapted to receive the tuned radio signals and to partially demodulate the tuned radio signals, the first baseband unit being further adapted to transmit partially demodulated signals;
    a second baseband unit;
the distributed radio system further comprising
    a digital communication channel adapted to receive the partially demodulated signals and to redistribute the partially demodulated signals to the second baseband unit;
    wherein the respective tuned radio signals are inputted to an analog to digital converter, the analog to digital converter being adapted to transmit digital signals to the first baseband unit for partially demodulating the digital signals;
    wherein the first receiver and the second receiver comprise:
        an input/output system adapted to:
            transmit the partially demodulated signals from the first baseband unit of the first receiver to the digital communication channel, receive the partially demodulated signals generated by second receiver via the digital communication channel, and transmit the received partially demodulated signals of the second receiver to the second baseband unit of the first receiver for full demodulation.

2. A distributed radio system as claimed in claim 1, wherein the partially demodulated signals are adapted to be transmitted serially.

3. A distributed radio system as claimed in claim 2, wherein the digital transmitted signals are clockless digital signals embedding clock signals that have a fixed relationship with a clock of the analog to digital converter.

4. A distributed radio system as claimed in claim 1, wherein the receivers are adapted to receive signals according to a respectively same or respectively different communication standard.

5. A distributed radio system as claimed in claim 1, wherein each receiver further comprises:
a second tuner, the first tuner being coupled to the first analog to digital converter, the second tuner being coupled to a second analog to digital converter.

6. A distributed radio system as claimed in claim 1, wherein the input/output system of the first receiver is adapted to receive the serially transmitted signals by a second analog to digital converter included in the first receiver and to transmit the serially received signals to the input/output system of the second receiver via the digital communication channel, the second baseband unit of the second receiver demodulating the signals received by the both second tuners.

7. A distributed radio system as claimed in claim 1, wherein the input/output system of the second receiver is adapted to receive the serially transmitted signals by a first analog to digital converter of the second receiver and to transmit the serially received signals to the input/output system of the first receiver via the digital communication channel, the second baseband unit of the first receiver demodulating the signals received by the both first tuners.

8. A distributed radio system as claimed claim 1, wherein each receiver comprises
a digital front end coupled between one of the respective analog to digital converters and the input/output system for correcting errors occurring during reception of the radio signals and conversion of tuned radio signals received by the first or second receiver.

9. A distributed radio system as claimed in claim 1, wherein each receiver comprises
a control unit adapted to control the parameters of the tuner and the operation of the first baseband, the control unit generating control parameters, the receiver further comprising
a multiplexing unit for combining a partial demodulated signal generated by the first baseband, the signal being indicative for a partial demodulation of the input signal, the multiplexing unit further receiving control parameters from the control unit, the multiplexing unit being adapted to generate a serial signal representative of the partial demodulated signal multiplexed and of the control parameters generated by the control unit.

10. A distributed radio system as claimed in claim 9, wherein the multiplexing unit comprises a multiplexer coupled to a serializer.

11. The distributed radio system of claim 1, wherein each receiver is implemented in a separate chip.

12. A vehicle comprising a distributed radio system as claimed in claim 1.

13. A method for operating a distributed radio system comprising steps of: receiving a first and a second radio signal in a respective first receiver and second receiver each receiver having a tuner and generating tuned radio signals, transmitting the tuned radio signals to a respective first baseband unit in the first receiver, partially demodulating the tuned signals in the first baseband unit and generating partially demodulated signals, transmitting the partially demodulated signals to a digital communication channel, redistributing the partially demodulated signals to a second baseband unit in the second receiver inputting the tuned radio signals to an analog to digital converter, the analog to digital converter being adapted to transmit digital signals to the first baseband unit for partially demodulating the digital signals; adapting an input/output system in the first receiver and the second receiver to: transmit the partially demodulated signals from the first baseband unit of the first receiver to the digital communication channel, receive the partially demodulated signals generated by second receiver via the digital communication channel, and transmit the received partially demodulated signals of the second receiver to the second baseband unit of the first receiver for full demodulation.

* * * * *